J. W. JONES & G. H. TUCKER.
HARROW ATTACHMENT.
APPLICATION FILED DEC. 16, 1911.
1,083,364.
Patented Jan. 6, 1914.
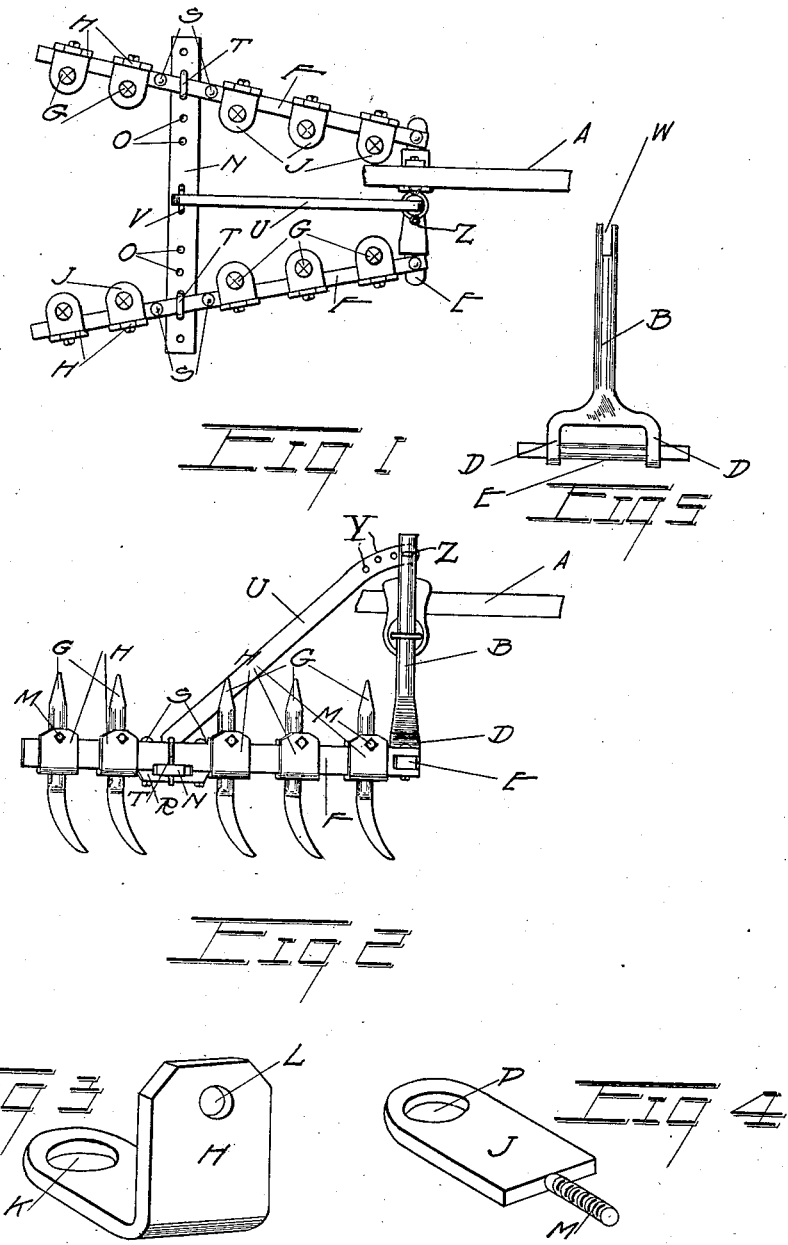

UNITED STATES PATENT OFFICE.

JAMES W. JONES AND GEORGE H. TUCKER, OF WINTERS, TEXAS.

HARROW ATTACHMENT.

1,083,364. Specification of Letters Patent. Patented Jan. 6, 1914.

Application filed December 16, 1911. Serial No. 666,092.

*To all whom it may concern:*

Be it known that we, JAMES W. JONES and GEORGE H. TUCKER, citizens of the United States, residing at Winters, in the county of Runnels and State of Texas, have invented certain new and useful Improvements in Harrow Attachments, of which the following is a specification.

Our invention relates to new and useful improvements in harrow attachments for cultivators. Its object is to provide a harrow attachment for cultivators, comprising two similar members, one of which is adapted to be attached to each cultivator beam, thus making it possible to employ the cultivator mechanism for adjusting the beams, to regulate the relative positions of the two harrow members.

Another object is to provide a harrow, consisting of two members diverging rearwardly from their point of support, and adapted to be adjusted with regard to their angle of divergence, thus making it possible to regulate the area of ground acted upon by the harrow.

A further object consists in the provision of a means for elevating the rear portion of the harrow, thus regulating the depth to which the teeth penetrate the ground.

A still further object of the invention lies in the provision of a convenient means by which the teeth of the harrow may be clamped in the frame formed by said divergent members.

Finally the object of the invention is to provide a harrow of strong and simple construction, the parts of which may be quickly assembled or taken apart, and which will not be likely to loosen in use or to be readily damaged.

With these and various other objects in view, our invention has relation to certain novel features of the construction and operation, an example of which is described in the following specification and illustrated in the accompanying drawing, wherein:

Figure 1 is a plan view showing the harrow attachment, in which are embodied the novel features constituting the present invention. Fig. 2 is a view of the same in side elevation. Figs. 3 and 4 are perspective detail views respectively showing two clamping members which serve to secure the harrow teeth to a suitable frame. Fig. 5 is a detail view showing a standard adapted to have its upper end clamped rigidly to the cultivator beam and its lower end pivotally receive the harrow attachment.

Referring now more particularly to the drawing, wherein like reference characters designate similar parts in all the figures, the letter "A" denotes a cultivator beam, of any common and well-known type, to which beam is rigidly clamped an upright or vertical standard "B".

The clamping means employed may be any of those now in common use to furnish means for rigidly supporting a plow standard from a cultivator beam, such as the well-known type shown in the drawing. The lower end of the rod "B" carries a pair of spaced brackets "D", in which brackets is journaled a short transverse spindle, "E", having its extremities projecting slightly beyond said brackets and horizontally flattened. The flattened extremities of the spindle "E" furnish pivotal supports for a pair of rearwardly extending divergent beams "F", each of which beams serves to support a plurality of equidistant vertical harrow teeth "G". These harrow teeth will preferably be pointed at one extremity, the other extremity being slightly curved forming what is commonly known as a "duckbill."

Each harrow tooth is adapted to be secured to its correlated beam "F" by a pair of clamping members "H" and "J", the former being bent to form a right angle. One portion of this angular member, which is adapted to project beneath the correlated beam, is provided with an aperture "K" through which the tooth "G" may be passed. The other portion of the angular member "H" will occupy a vertical position contiguous with the outer surface of the beam, and is provided with a small aperture "L" at its upper extremity adapted to receive a threaded stud "M" which projects from one extremity of the member "J". The other extremity of the member J is provided with a circular aperture "D" adapted to receive the harrow tooth. When the two members H and J occupy their proper positions relative to each other and to the beam F, the apertures P and K will be in vertical alinement, and the stud M will project through the aperture L, a nut being provided upon the extremity of said stud contiguous with the vertical portion of the member H. It is thus apparent that the members H and J in conjunction may be made to clamp the harrow tooth securely in place at any desired elevation, with either of its two extremities uppermost.

A description will now be given of the means employed to secure adjustment of the angle formed between the two converging beams F. A bar N containing a plurality of small equidistant apertures O is transversely extended beneath the center portions of the two beams F. The end portions of the bar N are received in slots formed between the undersides of the beams F and members R rigidly secured to said beams by bolts S. The members R serve to prevent any vertical motion of the bar N relative to the beam, and also to prevent any motion of said bar in a direction longitudinal with said beams.

In order to prevent a transverse motion between the bar and the beams after the latter have been adjusted at the proper angle, a U shaped bolt T is made to establish an engagement between each beam and the bar, said bolt being mounted in an inverted position with its extremities extended downward through two of the apertures O. It is apparent that the harrow beams are held in a fixed relation to each other when the bolts T are thus made to establish a connection between said beams and the bar N. The angle of divergence between the two beams may be readily adjusted by removing the bolts T and replacing them each in a different pair of holes O, after the beams have been shifted to the proper angle.

The means provided for producing a slight vertical adjustment of the rear portion of the harrow comprises a bar U, having one of its extremities pivotally connected to the centers of the bar N. by means of a U bolt V., said bar being extended forwardly at an upward inclination, and having its upper extremity entering a slot W, provided for that purpose in the upper end of the standard B. Said extremity of the bar U is curved slightly downward, and is provided with a number of apertures Y to receive the cotter pin Z by which pivotal connection is established between the members U and B. Obviously, the rear end of the harrow may be adjusted through slight variations of height according to which of the apertures Y is made to receive the pin Z.

From the foregoing disclosure in conjunction with the accompanying drawing, it will be readily apparent that a harrow of the character described is adapted to fulfil all the necessary requirements of such a device.

The invention is presented as including all such changes and modifications as are included within the scope of the following claim.

What we claim is:—

In a device of the character described, the combination with a vertical standard, of a pair of spaced brackets carried by the lower extremity of said standard, a spindle journaled in said bracket, a pair of divergent horizontal beams having their adjacent extremities pivoted upon the extremities of said spindle, the pivotal connection being such as to permit a swinging displacement of the beams to or from each other, means establishing a rigid relation between the middle portions of the bars, a plurality of harrow teeth supported by each of said beams, and means for holding the beams in various positions of angular displacement about their pivoted forward extremities.

In testimony whereof we have signed our names to this specification in the presence of two subscribing witnesses.

JAMES W. JONES.
GEORGE H. TUCKER.

Witnesses:
C. W. YOACHUM,
CHAS. MEEKS.

---

Copies of this patent may be obtained for five cents each, by addressing the "Commissioner of Patents, Washington, D. C."